(12) United States Patent
Jaradi et al.

(10) Patent No.: US 11,780,404 B1
(45) Date of Patent: Oct. 10, 2023

(54) SEATBELT ASSEMBLY

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/750,627

(22) Filed: May 23, 2022

(51) Int. Cl.
  *B60R 22/34* (2006.01)
  *B60R 22/20* (2006.01)
(52) U.S. Cl.
  CPC ........ *B60R 22/3413* (2013.01); *B60R 22/202* (2013.01)
(58) Field of Classification Search
  CPC ..... B60R 22/28; B60R 22/203; B60R 22/202; B60R 22/3413
  See application file for complete search history.

(56) References Cited

U.S. PATENT DOCUMENTS

| | | | |
|---|---|---|---|
| 2,680,476 A * | 6/1954 | Saffell | B60R 22/28 244/122 B |
| 4,027,905 A | 6/1977 | Shimogawa et al. | |
| 5,234,181 A * | 8/1993 | Schroth | B60R 22/1953 297/480 |
| 5,265,908 A | 11/1993 | Verellen et al. | |
| 5,566,978 A | 10/1996 | Fleming et al. | |
| 5,700,034 A | 12/1997 | Lane, Jr. | |
| 6,099,078 A | 8/2000 | Smithson et al. | |
| 6,129,385 A * | 10/2000 | Blackadder | B60R 22/3413 280/805 |
| 6,145,881 A | 11/2000 | Miller, III et al. | |
| 6,209,916 B1 | 4/2001 | Smithson et al. | |
| 6,336,664 B1 | 1/2002 | Roder | |
| 6,736,427 B2 | 5/2004 | Herrmann et al. | |
| 6,913,288 B2 | 7/2005 | Schulz | |
| 6,935,701 B1 * | 8/2005 | Arnold | B60R 22/202 280/808 |

(Continued)

FOREIGN PATENT DOCUMENTS

| | | | | |
|---|---|---|---|---|
| CN | 108608984 A | * | 10/2018 | ........... B60R 22/203 |
| CN | 208855587 U | | 5/2019 | |

(Continued)

OTHER PUBLICATIONS

FR 2695603 A1 translation from espacenet.com Jan. 2023.*

(Continued)

*Primary Examiner* — James A Shriver, II
*Assistant Examiner* — Maxwell L Meshaka
(74) *Attorney, Agent, or Firm* — Frank A. MacKenzie; Bejin Bieneman PLC (57) ABSTRACT

An assembly includes a track. The assembly includes a first plate slidably engaged with the track. The assembly includes a second plate spaced from the first plate and coupled to the first plate. The second plate is releasably lockable to the track. The assembly includes a webbing guide supported by the first plate. The assembly includes a seatbelt webbing extending through the webbing guide. The assembly includes a spring coupled between the first plate to the second plate.

20 Claims, 7 Drawing Sheets

(56) References Cited

U.S. PATENT DOCUMENTS

| | | | |
|---|---|---|---|
| 7,226,120 | B2 | 6/2007 | Yamazaki |
| 7,331,610 | B2 | 2/2008 | Herrmann |
| 8,800,735 | B2 | 8/2014 | Ruthinowski et al. |
| 8,820,789 | B2 | 9/2014 | Merrill et al. |
| 9,027,964 | B2 * | 5/2015 | Neero .................. B60R 22/203 280/804 |
| 9,238,448 | B2 | 1/2016 | Wier et al. |
| 9,499,121 | B2 | 11/2016 | Dingman et al. |
| 9,738,248 | B2 | 8/2017 | Dingman et al. |
| 9,809,193 | B2 | 11/2017 | Marriott et al. |
| 10,953,847 | B2 | 3/2021 | Hamilton et al. |
| 10,981,537 | B2 * | 4/2021 | Vega ..................... B60R 22/203 |
| 11,273,790 | B2 | 3/2022 | Hamilton et al. |
| 11,505,159 | B2 * | 11/2022 | Jaradi ................... B60R 22/202 |
| 11,639,153 | B2 | 5/2023 | Farooq et al. |
| 2003/0116954 | A1 | 6/2003 | Singer |
| 2005/0206215 | A1 * | 9/2005 | Arnold .................. B60R 22/202 280/806 |
| 2011/0133439 | A1 | 6/2011 | Pearce |
| 2014/0042282 | A1 * | 2/2014 | Neero .................. B60R 22/202 248/297.31 |
| 2017/0267208 | A1 * | 9/2017 | Marriott ............... B60R 22/203 |
| 2018/0222440 | A1 | 8/2018 | Grzic et al. |
| 2020/0238948 | A1 * | 7/2020 | Williams ................ B60R 22/28 |
| 2020/0339063 | A1 * | 10/2020 | Jaradi ................... B60R 21/013 |

FOREIGN PATENT DOCUMENTS

| | | | | |
|---|---|---|---|---|
| FR | 2695603 | A1 * | 3/1994 | ............ B60R 22/28 |
| GB | 2382802 | A | 11/2003 | |
| KR | 20020027901 | A | 4/2002 | |
| KR | 102260808 | B1 * | 6/2021 | |
| WO | WO-2009082304 | A1 * | 7/2009 | ............ B60R 22/28 |

OTHER PUBLICATIONS

Non-Final Office Action dated Dec. 8, 2022 re U.S. Appl. No. 17/748,079, filed May 19, 2022.

Non-Final Office Action for U.S. Appl. No. 17/750,627, filed May 23, 2022, as issued by the UPSTO dated Jun. 14, 2023.

* cited by examiner

SEATBELT ASSEMBLY

BACKGROUND

A seatbelt system may include a retractor for paying out seatbelt webbing. The retractor includes a spool around which the webbing is wrapped. The webbing unwinds from the spool when the webbing is buckled by the seat occupant. In the event of a vehicle impact, the spool is locked, preventing its rotation, and preventing any further unwinding of the webbing. The locking, in combination with an inertia of the occupant, may result in a resistive load of the webbing against the occupant. A load limiting mechanism within the retractor allows webbing to payout under impact loading to prevent occupant loads from exceeding predetermined levels. A known load limiting mechanism includes a torsion bar disposed in a center of the spool. The torsion bar may be a cylindrical bar of steel having a yield strength selected to allow the bar to torsionally yield at a value associated with a potential threshold of resistive load. Twisting of the torsion bar allows webbing to come off the retractor spool under high loads, thereby controlling the loads sustained by the occupant against the webbing during an impact.

DETAILED DESCRIPTION

An assembly includes a track. The assembly includes a first plate slidably engaged with the track. The assembly includes a second plate spaced from the first plate and coupled to the first plate. The second plate is releasably lockable to the track. The assembly includes a webbing guide supported by the first plate. The assembly includes a seatbelt webbing extending through the webbing guide. The assembly includes a spring coupled between the first plate to the second plate.

The assembly may include guide rod elongated from the first plate to the second plate, the spring surrounding the guide rod.

The assembly may include at least one of the first plate and the second plate defining a hole, the guide rod being axially movable in the hole.

The assembly may include a second spring concentric with the spring, the second spring surrounding the guide rod.

The spring may bias the first plate away from the second plate.

The spring may be elongated along an axis, the first plate being slidable along the axis.

The spring may be compressible from an extended position to a compressed position, a distance between the first plate and the second plate being shorter in the compressed position than in the extended position.

The spring may be compressible by the seatbelt webbing from the extended position to the compressed position.

The first plate may be supported by the spring.

The seatbelt webbing may apply a force downwardly on the webbing guide, the webbing guide and the first plate are moveable downwardly along the track when the force exceeds the spring force of the spring.

A distance between the first plate and the second plate may decrease as the force is applied.

The spring may be compressible between an extended position and a compressed position, the spring being in the compressed position when the force is applied.

The assembly may include a second spring concentric with the spring, the second spring being between the first plate and the second plate.

The second spring may be shorter in axial length than the spring.

The second spring may be stiffer than the spring.

The first plate may be slidable by the seatbelt webbing relative to the second plate from a raised position to a lowered position.

The spring may be a coil spring.

The assembly may include a leaf spring between the second plate and the track.

A vehicle includes a pillar and a track supported by the pillar. The vehicle includes a first plate slidably engaged with the track. The vehicle includes a second plate spaced from the first plate and coupled to the first plate. The second plate is releasably lockable to the track. The vehicle includes a webbing guide supported by the first plate. The vehicle includes a seatbelt webbing extending through the webbing guide. The vehicle includes a spring coupled between the first plate to the second plate.

The vehicle may include a guide rod elongated from the first plate to the second plate, the spring surrounding the guide rod.

With reference to the Figures, wherein like numerals indicate like parts throughout the several views, an assembly 10 for a vehicle 12 includes a track 14. The assembly 10 includes a first plate 16 slidably engaged with the track 14. The assembly 10 includes a second plate 18 spaced from the first plate 16 and coupled to the first plate 16. The second plate 18 is releasably lockable to the track 14. The assembly 10 includes a webbing guide 20 supported by the first plate 16. The assembly 10 includes a seatbelt webbing 22 extending through the webbing guide 20. The assembly 10 includes a spring 24 coupled between the first plate 16 to the second plate 18.

In the event of an impact to the vehicle 12, an occupant may apply a load to the seatbelt webbing 22. The seatbelt webbing 22 may apply a downward force F to the webbing guide 20. The webbing guide 20 may move downwardly by the downward force F of the seatbelt webbing 22, and, in turn, move the first plate 16 downwardly. The spring 24 may compress as the first plate 16 moves downwardly to absorb energy and limit the load on an occupant in the event of the impact. The spring 24 is resilient, as described below, such that the spring 24 returns the first plate 16 to a raised position after the downward force is removed from the seatbelt webbing 22. In other words, the assembly 10 is resettable.

Figure 1:
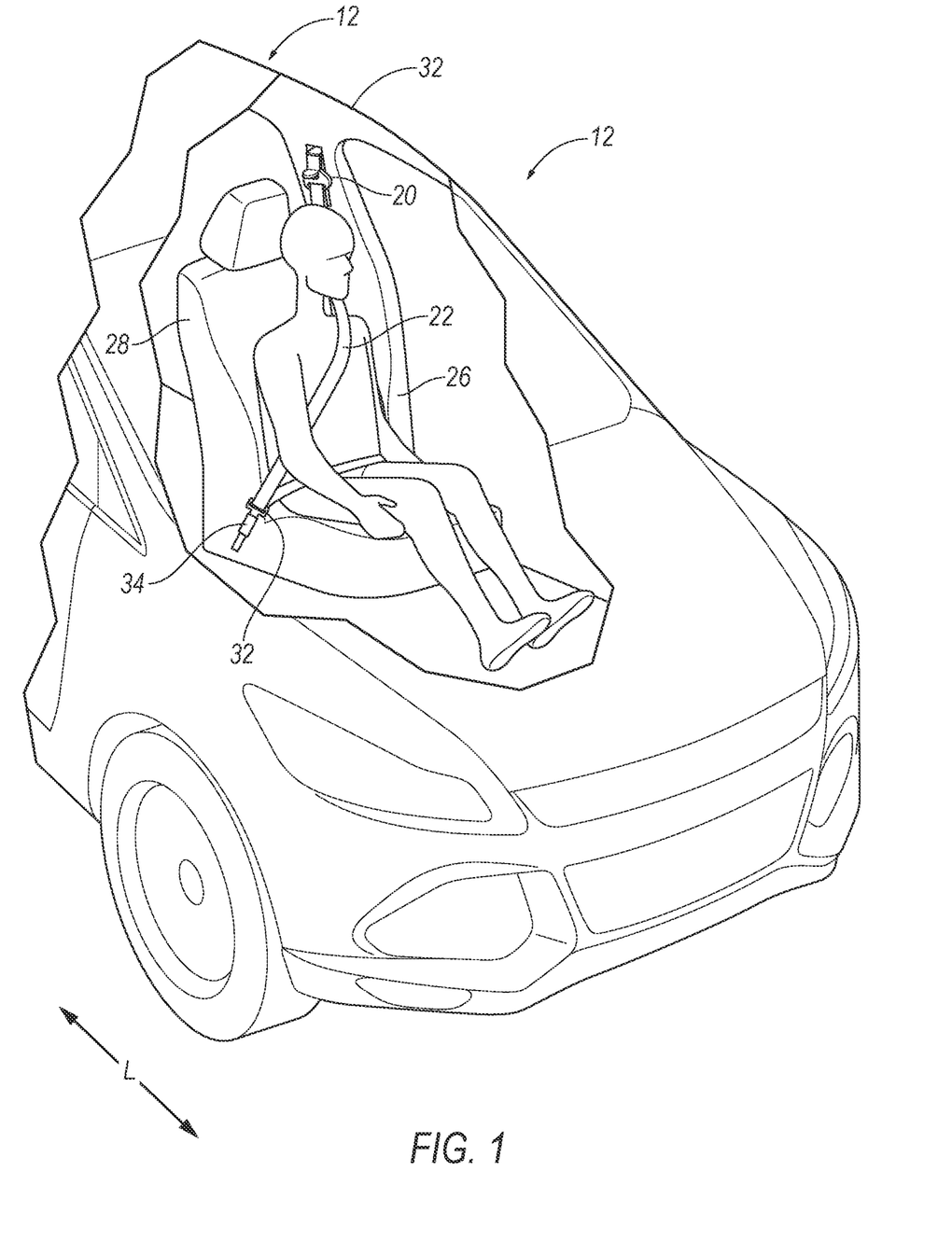
FIG. 1 is a perspective view of a vehicle having a seat and a seatbelt assembly.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle body (not numbered). The vehicle body may define a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body includes two roof rails (not numbered). The roof rails are spaced from one another in a cross-vehicle direction. The roof rails each extend longitudinally along the vehicle body, i.e., along a vehicle-longitudinal axis L.

The vehicle body includes a vehicle roof (not numbered) and a vehicle floor (not numbered) spaced downwardly from the vehicle roof. The vehicle roof may define the upper boundary of the passenger compartment and may extend from the front end of the passenger compartment to the rear end of the passenger compartment. The vehicle roof may extend from one roof rail to the other roof rail. The vehicle roof may be irremovably fixed to the roof rails. In other words, the vehicle roof is secured to the roof rails in such a way that removal requires destruction such as cutting, e.g., cutting material and/or welded joints, etc. As an example, the vehicle roof may be attached to both roof rails, e.g., by welding, fasteners, etc.

Figure 2:
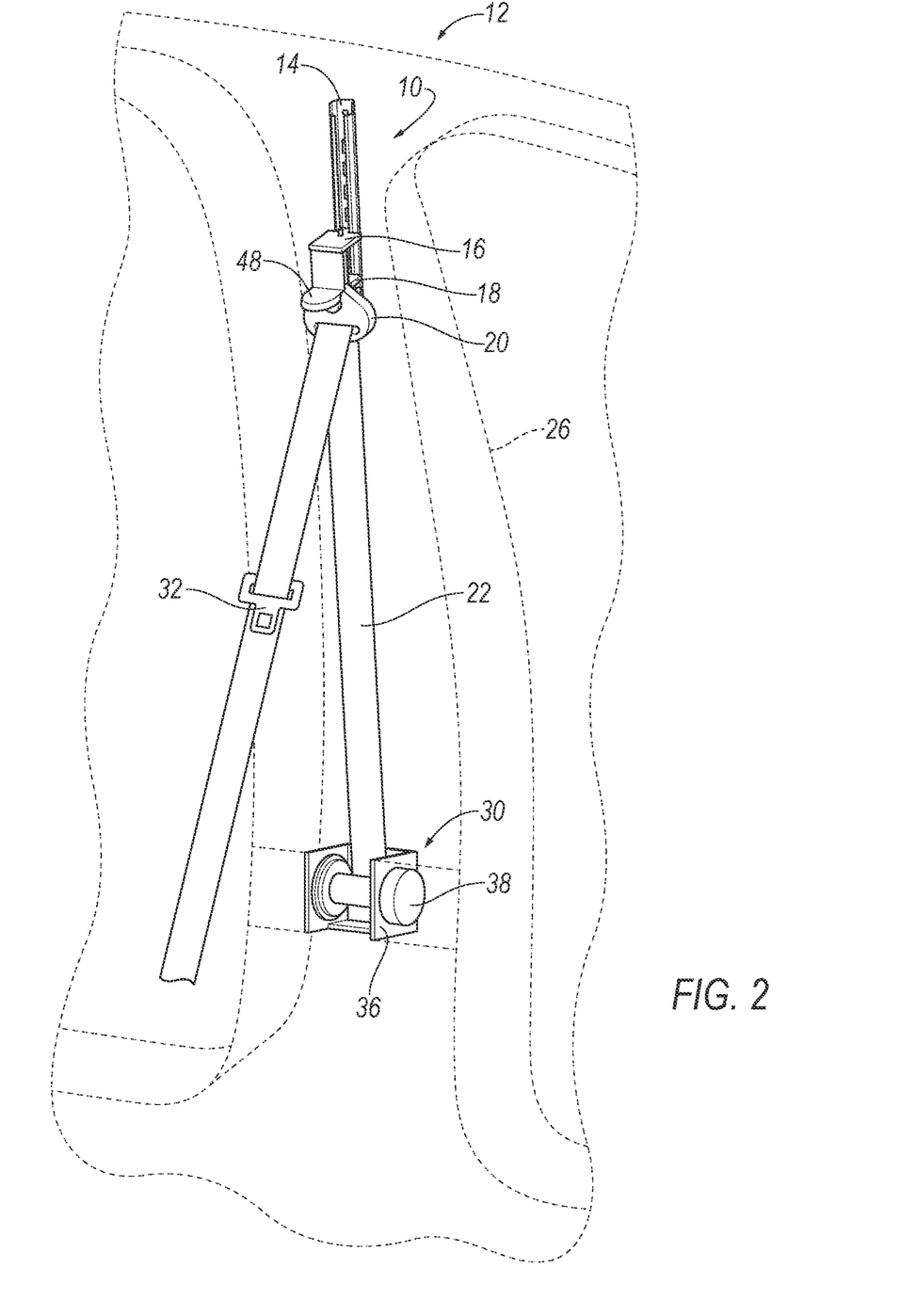
FIG. 2 is a perspective view of the seatbelt assembly.
Figure 3:
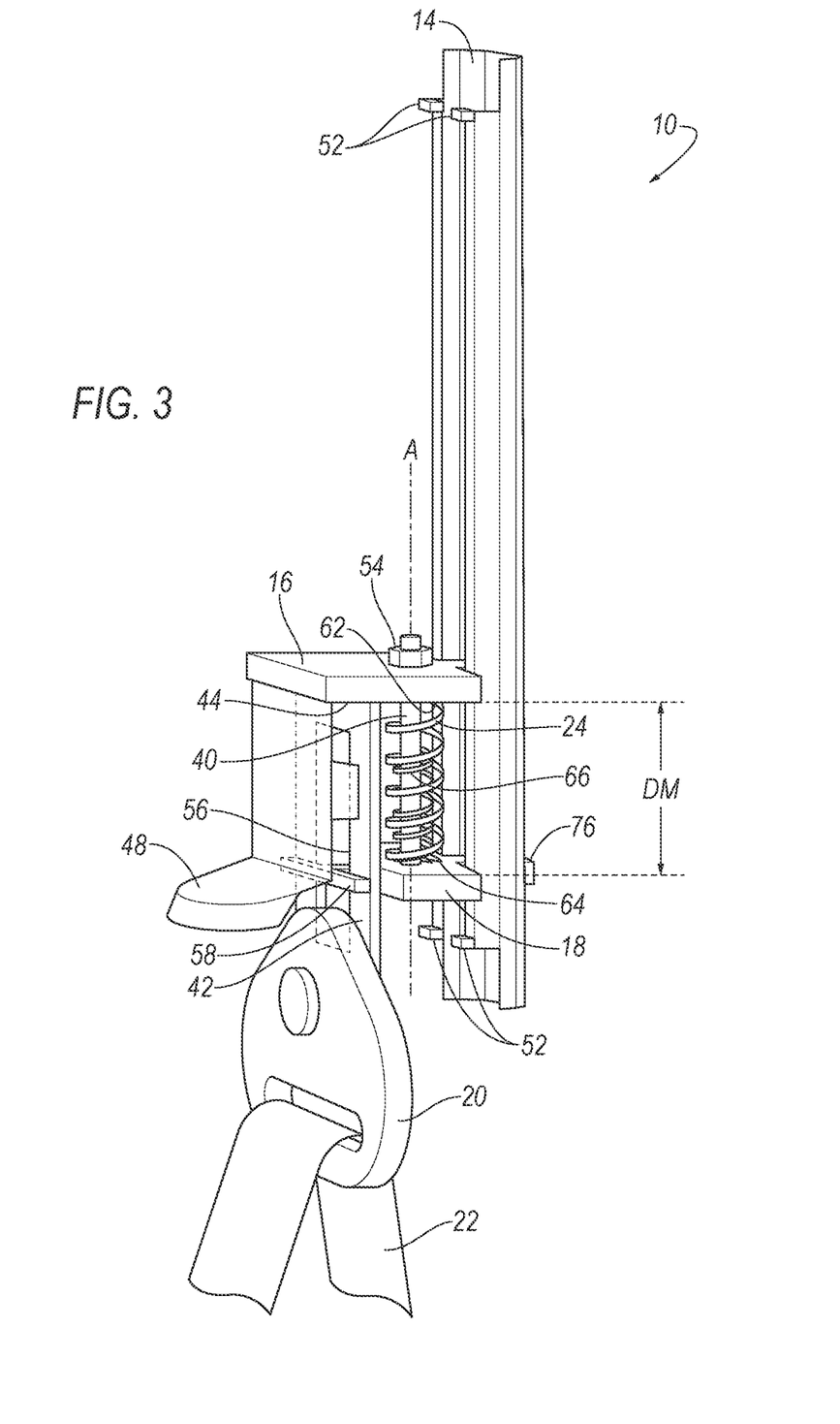
FIG. 3 is a perspective view of a webbing guide with a first plate at a maximum distance from a second plate.
Figure 4:
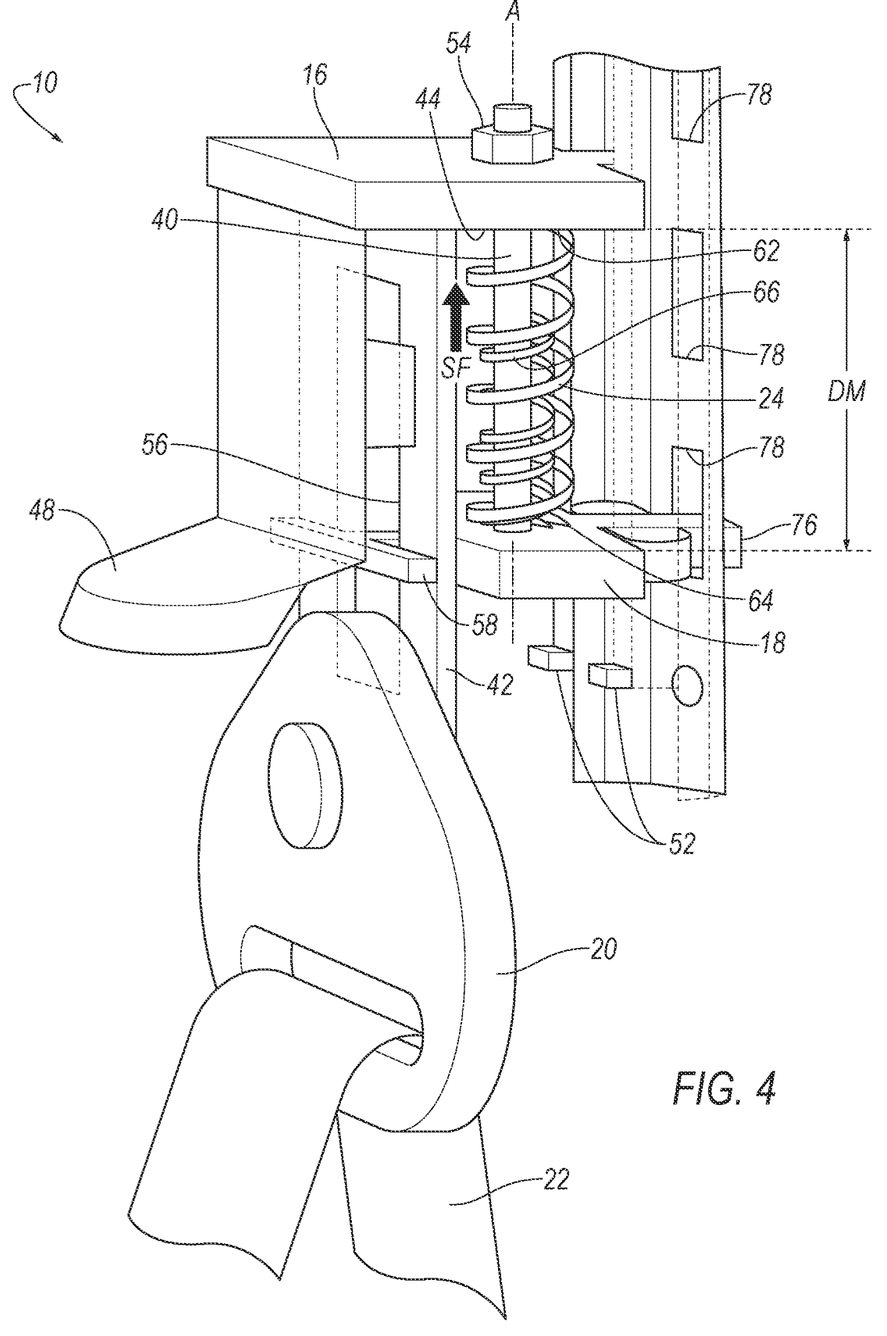
FIG. 4 is a perspective view of the webbing guide with the first plate at the maximum distance from the second plate.

With reference to FIGS. 1 and 2, the vehicle body includes a plurality of pillars 26. For example, the vehicle body may include an A-pillar and a B-pillar on each side of the vehicle 12. The A-pillars may extend between a windshield (not shown) and front doors (not numbered) of the vehicle 12. In other words, the A-pillars may be disposed at the front end of the passenger cabin. The B-pillars may extend behind front doors, e.g., between adjacent doors. In other words, the B-pillars may be spaced from the A-pillars along the vehicle-longitudinal axis L. The vehicle 12 may include additional pillars 26, e.g., C-pillars, D-pillars. The pillars 26 may extend from the vehicle roof to the vehicle floor.

The vehicle 12 may include one or more seats 28. Specifically, the vehicle 12 may include any suitable number of seats 28. The seats 28 are supported by the vehicle floor. The seats 28 may be arranged in any suitable arrangement in the passenger compartment. As in the example shown in the Figures, one or more of the seats 28 may be at the front end of the passenger compartment, e.g., a driver seat 28 and/or a passenger seat 28. In other examples, one or more of the seats 28 may be behind the front end of the passenger compartment, e.g., at the rear end of the passenger compartment. The seats 28 may be movable relative to the vehicle floor to various positions, e.g., movable fore-and-aft and/or cross-vehicle. The seat 28 may be of any suitable type, e.g., a bucket seat. The seats 28 may be adjacent the door openings in the vehicle body.

With reference continued reference to FIGS. 1 and 2, the vehicle 12 includes a seatbelt assembly 10 supported by the vehicle body. Specifically, the seatbelt assembly 10 is supported by a pillar 26 of the vehicle 12. In the example shown in the Figures, the seatbelt assembly 10 is supported by the B-pillar of the vehicle body. The seatbelt assembly 10 may be supported by any suitable pillar 26, e.g., a C-pillar or a D-pillar. The seatbelt assembly 10 may be disposed adjacent the seat 28. For example, as shown in the Figures, the seatbelt assembly 10 is adjacent a front seat 28. The seatbelt assembly 10 may be adjacent any seat 28 in the vehicle 12. The vehicle 12 may include any suitable number of seatbelt assemblies 10 supported by any suitable pillar 26 of the vehicle 12.

The seatbelt assembly 10 may include a seatbelt retractor 30 and the seatbelt webbing 22 retractably payable from the seatbelt retractor 30. The seatbelt assembly 10 may include an anchor (not shown) coupled to the seatbelt webbing 22, and a clip 32 that engages a buckle 34. The seatbelt assembly 10, when fastened, retains an occupant on the seat 28, e.g., during sudden decelerations of the vehicle 12. The seatbelt webbing 22 may extend continuously from the seatbelt retractor 30 to the anchor. For example, one end of the seatbelt webbing 22 feeds into the seatbelt retractor 30, and the other end of the seatbelt webbing 22 is fixed to the anchor. The anchor may, for example, be fixed to the seat 28. Alternatively, the anchor may be fixed to the vehicle body, e.g., the B-pillar, the vehicle floor, etc. The anchor may be attached to the seat 28 in any suitable manner, e.g., with fasteners.

With reference to FIG. 2, the seatbelt retractor 30 includes a housing 36 and a spool 38 rotatably coupled to the housing 36. The spool 38 may have a cylindrical shape. The seatbelt webbing 22 may be coiled about the spool 38. The seatbelt retractor 30, e.g., the spool 38, may be lockable from an unlocked position to a locked position. In the unlocked position, the seatbelt webbing 22 may be extended from and retracted into the seatbelt retractor 30. In other words, the seatbelt webbing 22 may be coiled and uncoiled freely about the spool 38. In the locked position, the seatbelt retractor 30 prevents extension of the seatbelt webbing 22 to limit the forward movement of the occupant. In other words, the seatbelt webbing 22 may not be uncoiled from the spool 38 in the locked position. The seatbelt retractor 30 may be in the unlocked position by default, i.e., in the absence of a sudden deceleration. The seatbelt retractor 30 may change from the unlocked position to the locked position during a sudden deceleration of the vehicle 12, i.e., the deceleration may trigger components of the seatbelt retractor 30 to change from the unlocked position to the locked position, e.g., the spool 38.

The seatbelt retractor 30 may be moveable from an unlocked position to a locked position by conventional mechanisms known in the art. In the unlocked position, the seatbelt webbing 22 may be extended from and retracted into the seatbelt retractor 30. In the locked position, the seatbelt retractor 30 prevents extension of the seatbelt webbing 22 to limit the forward movement of the occupant. The seatbelt retractor 30 may be in the unlocked position by default, i.e., in the absence of a sudden deceleration. The seatbelt retractor 30 may change from the unlocked position to the locked position during a sudden deceleration of the vehicle 12, i.e., deceleration triggers components of the seatbelt retractor 30 to change from the unlocked position to the locked position.

The seatbelt retractor 30 may include a torsion bar (not shown). The torsion bar may be of the conventional type known in the art. The torsion bar may rotate freely in the unlocked position. In the locked position, one end of the torsion bar may be fixed to prevent rotation of the torsion bar, i.e., payout of the seatbelt webbing 22. The torsion bar may be designed to rotationally yield, that is, plastically deform, as the torsion bar is rotated by the seatbelt webbing 22, i.e., by the downward force F exerted on the seatbelt webbing 22 by the occupant. In particular, the torsion bar may be formed of suitable shape, dimension, and material to yield when subjected to a threshold rotational force. For example, when the seatbelt retractor 30 is in the locked position but the seatbelt webbing 22 exerts the downward force F on the seatbelt retractor 30, the torsion bar may prevent the seatbelt webbing 22 from paying out unless the downward force F by the seatbelt webbing 22 exceeds a threshold, in which case the rotational yielding may permit the seatbelt webbing 22 to payout.

The seatbelt retractor 30 includes a locking device (not shown) moveable to switch the seatbelt retractor 30 between the unlocked position and the locked position. Specifically, the housing 35 supports the locking device. The locking device is engaged with the torsion bar to restrict movement of the webbing. The locking device is anchored to the housing 35 and is moveable relative to the torsion bar between a locked position and an unlocked position. In the unlocked position, the locking device allows rotation of an end of the torsion bar relative to the housing 35 and, in the locked position, the locking device prevents rotation of that end of the torsion bar relative to the housing 35.

The locking device may be of a type known in the art and may be triggered in any suitable manner. As one example, the locking device may engage the torsion bar in response to deceleration of the vehicle, e.g., a sudden slowing of the vehicle, sudden stop, vehicle impact, etc. In other words, the locking device may be moved from the unlocked position to the locked position by a change in inertia. The locking device may engage the torsion bar in response to an activation sensor (not shown). The activation sensor senses sudden deceleration of the vehicle and triggers activation of the locking device, i.e., moves the locking device to the locked position. As one example, the activation sensor may be in the seatbelt retractor and may be, for example, a weighted pendulum, a centrifugal clutch, or any other suitable type.

The seatbelt retractor 30 may be mounted to the vehicle body. Specifically, the housing 36 of the seatbelt retractor 30 is mounted to the vehicle body. As in the example shown in the Figures, the seatbelt retractor 30 may be mounted to the B-pillar. As another example, when the seatbelt assembly 10 is adjacent a rear seat 28 of the vehicle 12, the seatbelt retractor 30 may be mounted to the C-pillar. In further examples, the seatbelt retractor 30 may be attached to the seat 28. The seatbelt retractor 30 may be attached to the vehicle body in any suitable manner, e.g., fasteners.

The seatbelt webbing 22 may be fabric, e.g., woven nylon. The clip 32 slides freely along the seatbelt webbing 22 and, when engaged with the buckle 34, divides the seatbelt webbing 22 into a lap band and a shoulder band. The seatbelt assembly 10 includes the webbing guide 20 engaged with the seatbelt webbing 22. The seatbelt webbing 22 extends through the webbing guide 20. For example, the seatbelt webbing 22 may freely slide through the webbing guide 20. In other words, the seatbelt webbing 22 may extend from the anchor through the webbing guide 20 to the seatbelt retractor 30. The webbing guide 20 may be spaced upwardly along the pillar 26 from the seatbelt retractor 30. For example, the webbing guide 20 may be disposed between the seatbelt retractor 30 and the vehicle roof. As another example, the seatbelt retractor 30 may be adjacent to the vehicle floor and the webbing guide 20 may be adjacent to the vehicle roof. The seatbelt assembly 10 may be a three-point harness, meaning that the seatbelt webbing 22 extends between three points around the occupant when fastened, specifically the anchor, the buckle 34, and the webbing guide 20. The seatbelt assembly 10 may, alternatively, include any suitable arrangement of points along the seatbelt webbing 22.

With reference to FIGS. 3-5B, the seatbelt assembly 10 includes the track 14. The track 14 is supported by the pillar 26, e.g., the B-pillar in the example shown in the Figures. The track 14 may be mounted to the pillar 26 in any suitable way, e.g., fasteners, welding, etc. The track 14 may be elongated along the pillar 26 from a top to a bottom. Specifically, the track 14 is elongated along an axis A along the pillar 26. The webbing guide 20 is movable along the track 14 and along the axis A. An occupant of the vehicle 12 may adjust the height of the webbing guide 20 to a desired location by moving the webbing guide 20 along the track 14 when the occupant is seated in the seat 28.

The assembly 10 includes the first plate 16 and the second plate 18 spaced along the axis A. Specifically, in the example shown in the Figures, the second plate 18 is spaced downwardly along the axis A from the first plate 16. The second plate 18 is coupled to the first plate 16. In other words, the first plate 16 and the second plate 18 may be connected to each other. In the example shown in the Figures, the seatbelt assembly 10 includes a guide rod 40 between the first plate 16 and the second plate 18 to couple the first plate 16 to the second plate 18. Specifically, the guide rod 40 is elongated from the first plate 16 to the second plate 18.

The webbing guide 20 is supported by the first plate 16. In the example shown in the Figures, the first plate 16 includes a flat plate 42 elongated along the axis A. The flat plate 42 extends from a bottom surface 44 of the first plate 16 along the axis A and toward the second plate 18. The webbing guide 20 may be supported on the flat plate 42 of the first plate 16. The webbing guide 20 may be mounted to the flat plate 42. The webbing may be mounted to the flat plate 42 in any suitable way, e.g., fasteners, welding, etc.

The first plate 16 is movable along the track 14. Specifically, the first plate 16 is slidably engaged with the track 14. In other words, the first plate 16 is slidable along the track 14. Specifically, the first plate 16 is slidable along the axis A. The first plate 16 may include a peg portion 46 that is engaged with the track 14 to slide along the track 14. In other words, the peg portion 46 is slidable along the track 14.

The second plate 18 is lockable to the track 14. Specifically, the second plate 18 is releasably lockable to the track 14. In other words, the second plate 18 may be releasably lockable relative to the track 14. The second plate 18 may be releasably lockable to the track 14 relative to the first plate 16. When an occupant is adjusting the height of the webbing guide 20, the occupant may release the second plate 18 by pulling a handle 48 of the seatbelt assembly 10 in a cross-vehicle direction.

The seatbelt assembly 10 may include a leaf spring 50 between the second plate 18 and the track 14 to releasably lock the second plate 18 relative to the track 14. The leaf spring 50 may provide a releasable force between the second plate 18 and the track 14 to lock the second plate 18 relative to the track 14. In other words, the leaf spring 50 may be engageable with the track 14 to releasably lock the second plate 18. The releasable force of the leaf spring 50 may be normal to an interior surface of the track 14 to limit movement of the second plate 18 relative to the track 14. The interior surface may include notches (not shown) that engage the leaf spring 50 to limit movement of the second plate 18 relative to the track 14. The leaf spring 50 may be released relative to the track 14 to adjust the height the webbing guide 20 along the track 14. The handle 48 may be pulled by an occupant in a cross-vehicle direction to release the leaf spring 50. In examples where the height of the webbing guide 20 is being adjusted, the leaf spring 50 is released and the occupant may move the first plate 16 and the second plate 18 along the track 14 to a desired height. In such examples, the peg portion 46 may slide along the track 14 until the webbing guide 20 reaches a position desired by the occupant. In an example of sudden deceleration, the leaf springs 50 remain engaged with the track 14 and the second plate 18 remains stationary relative to the track 14.

The seatbelt assembly 10 may include multiple leaf springs 50 between the track 14 and the second plate 18. For example, as shown in the Figures, the seatbelt assembly 10 may include a leaf spring 50 on a vehicle-forward side of the second plate 18 and a leaf spring 50 on a vehicle-rearward side of the second plate 18. The two leaf springs 50 may each provide releasable forces along the track 14 to lock the second plate 18 relative to the track 14.

In some situations, such as when an occupant adjusts the height of the webbing guide 20, the first plate 16 and the second plate 18 may be movable along the track 14 as a unit. Specifically, the first plate 16 and the second plate 18 may be movable along the axis A as a unit. In other words, in some situations, the first plate 16 and the second plate 18 may move together along the track 14. For example, when an occupant adjusts the height of the webbing guide 20, the first plate 16 and the second plate 18 move as a unit along the track 14 until the webbing guide 20 is at a location desired by the occupant. The occupant may use the handle 48, as described above, to release the leaf springs 50 and move the first plate 16 and second plate 18 along the track 14. In such an example, the peg portion 46 of the first plate 16 may slide along the track 14 until the webbing guide 20 is at a desired location. The occupant may release the handle 48 and the leaf springs 50 will engage with the track 14. The track 14 may include stoppers 52, one stopper 52 being adjacent the top of the track 14 and one stopper 52 being adjacent the bottom of the track 14. The stoppers 52 may provide boundaries for the movement of the first plate 16 and the second plate 18 along the track 14 when the first plate 16 and the second plate 18 move as a unit. In other words, as the occupant moves the first plate 16 and the second plate 18 to adjust the height of the webbing guide 20, the height of the webbing guide 20 may be limited to being between the stopper 52 at the top of the track 14 and the stopper 52 at the bottom of the track 14.

The second plate 18 may include a protrusion 76 that is elongated transverse to the axis A. The protrusion 76 may be insertable into one of a plurality of openings 78 along the track 14 when the second plate 18 is locked to the track 14. As an occupant adjusts the height of the webbing guide 20, the protrusion 76 may be removed from the openings 78 along the track 14 to move the first plate 16 and the second plate 18 move along the track. When the webbing guide 20 has reached the desired position, the protrusion 76 is inserted into one of the openings 78 along the track 14.

Figure 5A:
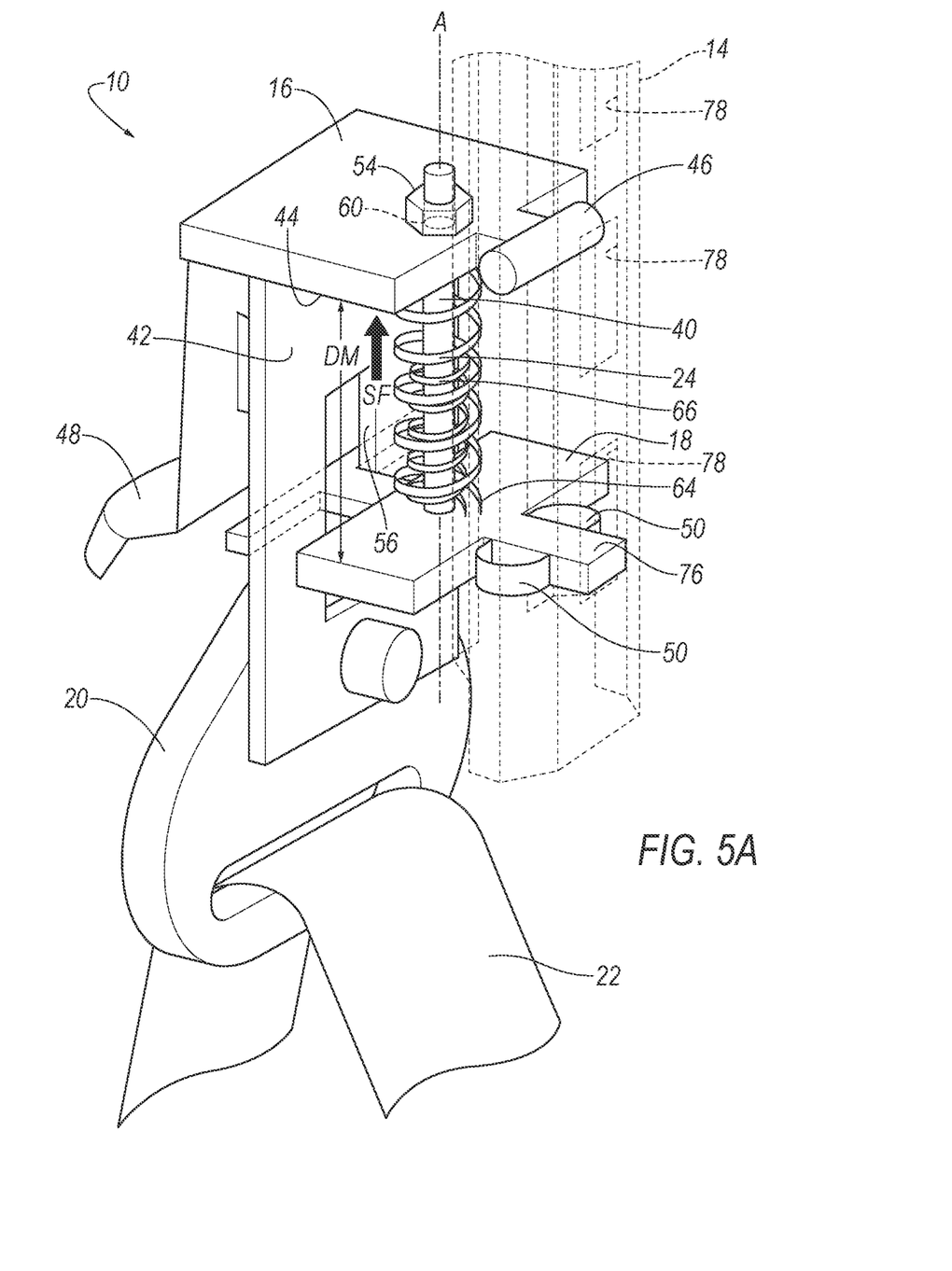
FIG. 5A is a rear perspective view of the webbing guide with the first plate at a raised position.

With reference to FIG. 5A, in situations as described above, a maximum distance DM between the first plate 16 and the second plate 18 may be maintained. The guide rod 40 may include a stop 54, e.g., a lock nut, adjacent and above the first plate 16 to maintain the maximum distance DM between the first plate 16 and the second plate 18 during movement as a unit. In other words, the first plate 16 does not slide off the guide rod 40 when the first plate 16 and the second plate 18 move as a unit due to the lock nut.

Figure 5B:
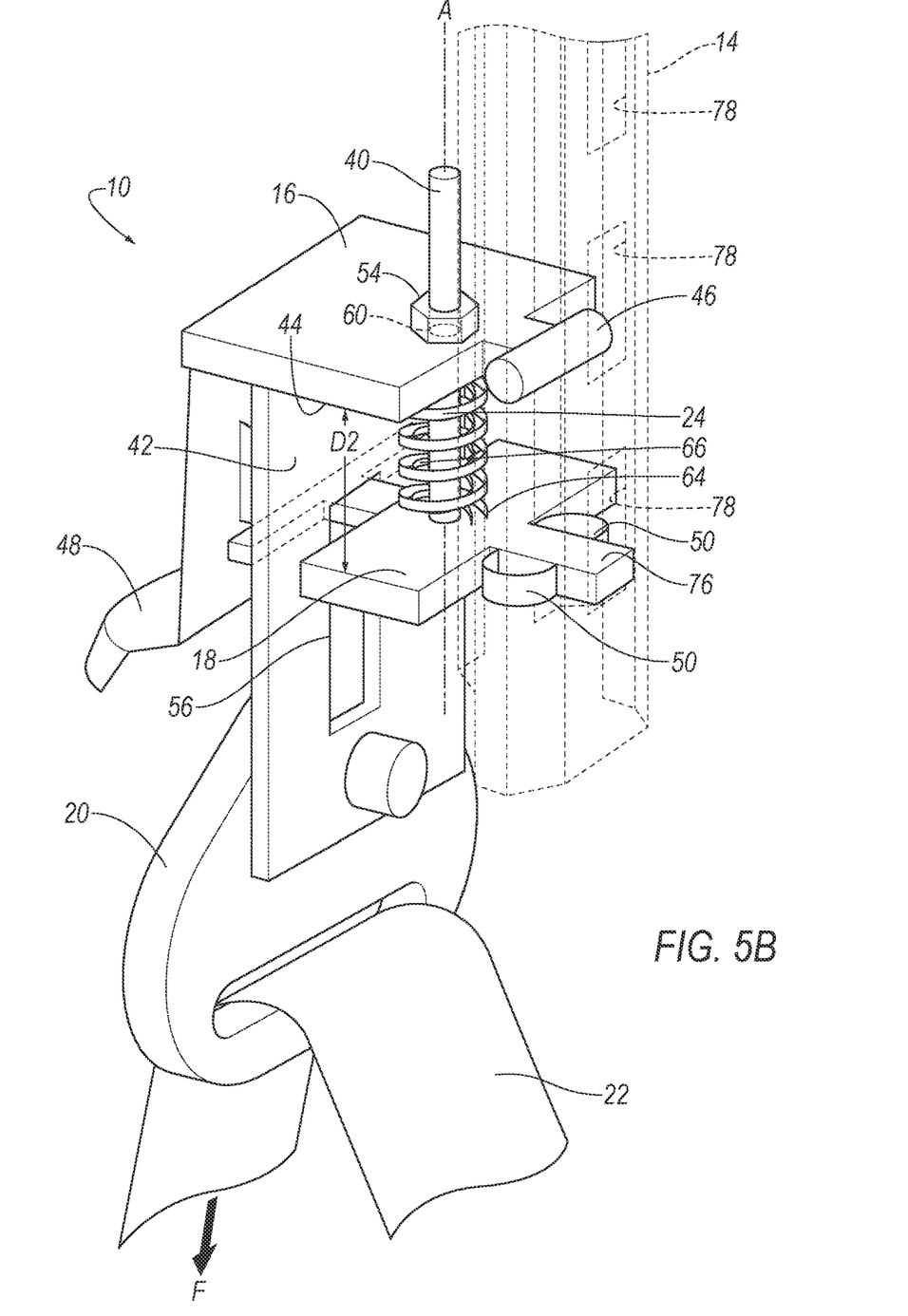
FIG. 5B is a rear perspective view of the webbing guide with the first plate at a lowered position.

With reference to FIG. 5B, in other situations, such as when the vehicle 12 experiences a sudden deceleration, at least one of the first plate 16 and the second plate 18 is movable relative to the other along the axis A from a raised position to a lowered position. The first plate 16 may move relative to the second plate 18 when the second plate 18 is locked to the track 14. The flat plate 42 may include a slot 56 elongated along the axis A and the second plate 18 may include a guide 58. The guide 58 is receivable by the slot 56. When the first plate 16 moves relative to the second plate 18, the guide 58 may slide along the slot 56 of the flat plate 42. In the event of a sudden deceleration, the seatbelt webbing 22 may apply the downward force F on the webbing guide 20 and the first plate 16. The first plate 16 and the webbing guide 20 move downwardly from the raised position to the lowered position due to the downward force F. The first plate 16 may move toward the second plate 18 when the second plate 18 is locked. The flat plate 42 moves relative to the second plate 18, i.e., along the axis A, when the first plate 16 moves toward the second plate 18. In the raised position, the first plate 16 may be at the maximum distance DM from the second plate 18. In the lowered position, the first plate 16 may be at a second distance D2 from the second plate 18. The second distance D2 is shorter than the maximum distance DM, i.e., the distance between the first plate 16 and the second plate 18 decreases when the first plate 16 is in the lowered position. In other words, the distance between the first plate 16 and the second plate 18 decreases as the downward force F is applied to the seatbelt webbing 22.

The guide rod 40 may be fixed relative to at least one of the first plate 16 and the second plate 18. The guide rod 40 may be fixed relative to at least one of the first plate 16 and the second plate 18 in any suitable way, e.g., molding, welding, etc. For example, as shown in the example in the Figures, the guide rod 40 is fixed to the second plate 18. The guide rod 40 may be movable relative to the other of first plate 16 and the second plate 18, i.e., whichever of the first plate 16 and the second plate 18 that the guide rod 40 is not fixed relative to. At least one of the first plate 16 and the second plate 18 defines a hole 60 such that the guide rod 40 is axially movable in the hole 60. In the example shown in the Figures, the first plate 16 defines the hole 60 to allow the guide rod 40 to move relative to the first plate 16.

In the event of a sudden deceleration, the seatbelt webbing 22 may provide the downward force F on the webbing guide 20 and first plate 16. When the downward force F is applied, the webbing guide 20 and the first plate 16 move downwardly along the track 14 and the first plate 16 moves to the lowered position. In other words, the first plate 16 moves from the maximum distance DM from the second plate 18 to the second distance D2 from the second plate 18, i.e., the first plate 16 moves closer to the second plate 18.

The seatbelt assembly 10 includes the spring 24 between the first plate 16 and the second plate 18. Specifically, the spring 24 is coupled between the first plate 16 and the second plate 18. In other words, a top end 62 of the spring 24 is connected to the first plate 16 and a bottom end 64 of the spring 24 is connected to the second plate 18. The spring 24 is elongated along the axis A between the first plate 16 and the second plate 18. The spring 24 surrounds the guide rod 40 between the first plate 16 and the second plate 18. In other words, the spring 24 surrounds the guide rod 40 and is elongated along the guide rod 40 from the first plate 16 to the second plate 18.

With reference to FIGS. 3-5A, the first plate 16 is supported by the spring 24. Specifically, the first plate 16 is supported on the second plate 18 by the spring 24. The spring 24 biases the first plate 16 away from the second plate 18. In other words, the spring 24 maintains the maximum distance DM between the first plate 16 and the second plate 18 during normal operation of the vehicle 12. The spring 24 may apply a spring force SF upwardly along the axis A and against the first plate 16 to maintain the maximum distance DM between the first plate 16 and the second plate 18. The lock nut, as discussed above, opposes the spring force SF of the spring 24 to maintain the maximum distance DM between the first plate 16 and the second plate 18. For example, in a situation where the occupant adjusts the height of the webbing guide 20 and the first plate 16 and the second plate 18 move as a unit, the spring 24 maintains the maximum distance DM between the first plate 16 and the second plate 18.

In situations where the first plate 16 moves relative to the second plate 18, such as in the event of sudden declaration of the vehicle 12, the spring 24 is compressible from an extended position to a compressed position. Specifically, when the seatbelt webbing 22 applies the downward force F to the webbing guide 20 and the downward force F exceeds the spring force SF of the spring 24, the webbing guide 20 and the first plate 16 moves downwardly along the track 14 and the spring 24 moves to the compressed position. Specifically, the spring 24 may be compressible by the seatbelt webbing 22 from the extended position to the compressed position when the downward force F exceeds the spring force SF. In other words, the spring 24 maintains the maximum distance DM until the downward force F exceeds a threshold. During normal operation of the vehicle 12, the maximum distance DM is maintained and the downward force F does not exceed the threshold. In the event of sudden deceleration of the vehicle 12, for example, due to an impact, the downward force F may overcome the threshold, i.e., the spring force SF, and the first plate 16 may move toward the second plate 18 and the spring 24 begins to move toward the compressed position. The spring 24 moving toward the compressed position absorbs energy from the seatbelt webbing 22 to limit the load to the occupant of the seat 28.

A length of the spring 24 may be shorter in the compressed position than the length of the spring 24 in the extended position. The spring 24 is in the extended position when the first plate 16 is in the raised position and the spring 24 is in the compressed position when the first plate 16 is in the lowered position. The length of the spring 24 decreases and the distance between the first plate 16 and the second plate 18 decreases as the seatbelt webbing 22 applies a force to the webbing guide 20. As described above, in the raised position, the first plate 16 is at the maximum distance DM from the second plate 18 and, in the lowered position, the first plate 16 is at the second distance D2 from the second plate 18. The spring 24 is in the compressed position when the first plate 16 is the at the second distance D2 from the second plate 18 and the spring 24 is in the extended position when the first plate 16 is at the maximum distance DM. In other words, the distance between the first plate 16 and the second plate 18 is shorter when the spring 24 is in the compressed position than in the raised position.

In some examples, such as shown in the Figures, the seatbelt assembly 10 may include a second spring 66 between the first plate 16 and the second plate 18. The second spring 66 may provide further energy absorption to the spring 24. The second spring 66 may be compressible along the axis A from an expanded position to a compressed position as the first plate 16 moves relative to the second plate 18. Specifically, the second spring 66 may be elongated along the axis A between the first plate 16 and the second plate 18. The second spring 66 is concentric with the spring 24. The second spring 66 surrounds the guide rod 40. Specifically, both the spring 24 and the second spring 66 surround the guide rod 40. The second spring 66 is shorter in axial length than the spring 24. In other words, the second spring 66 may not extend from the first plate 16 to the second plate 18, only between the first plate 16 and the second plate 18.

The second spring 66 is stiffer than the spring 24. In the event of a sudden deceleration of the vehicle 12, the downward force F may be applied to the webbing guide 20. In examples including the second spring 66, the first plate 16 moves downwardly along the axis A. The spring 24 absorbs energy as the first plate 16 moves toward the second plate 18. Once the first plate 16 has moved some distance, the second spring 66 may apply an additional spring force SF to the first plate 16 to further absorb energy as the first plate 16 continues to move toward the lowered position.

The spring 24 and the second spring 66 may each be any suitable type of spring 24. For example, such as shown in the Figures, the spring 24 may be a coil spring.

The assembly 10 may include any suitable number of springs 24, 66. In other words, the assembly 10 may include, such as shown in the example in the Figures, two springs 24, 66. In other examples, the assembly 10 may include only the spring 24. In further examples, the assembly 10 may include greater than two springs. In such examples, the springs may be concentric with each other.

Figure 6:
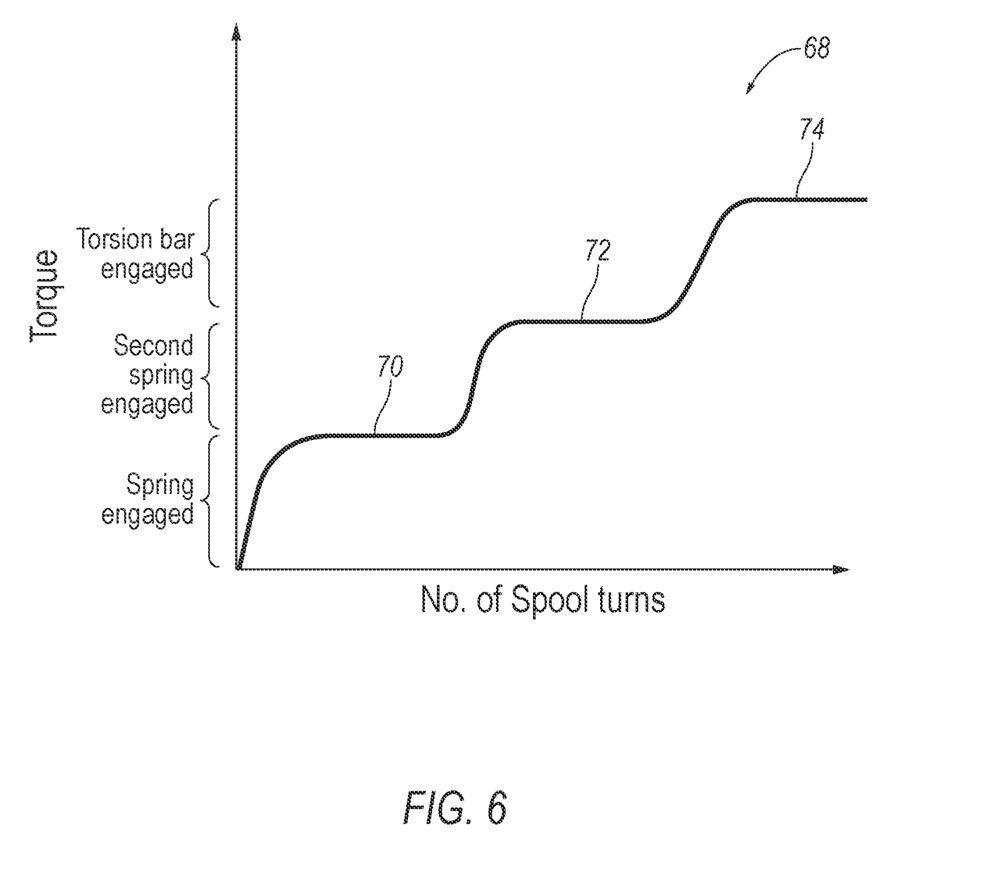
FIG. 6 is a graph of a simulation of a torque versus rotation of the seatbelt assembly spool.

FIG. 6 is a graph of a simulation of a curve 68 describing the relationship between the torque by the downward force F by the seatbelt webbing 22 and the number of rotations of the spool 38 of the seatbelt assembly 10. As the distance between the first plate 16 and the second plate 18 begins to decrease and the spring 24 move toward the compressed position, the torque initially increases relatively steeply. As the distance between the first plate 16 and the second plate 18 continues to decrease and the spring 24 continues to move toward the compressed position, the torque nears a first plateau and does not increase or increases relatively slowly, as shown over a first plateau region 70 of the curve 68. Over the first plateau region 70, the slope of the curve 68, that is, the rate of change of the torque relative to the rotation of the spool 38 is less than the slope of other regions of the curve 68. After the first plateau region 70, as the distance between the first plate 16 and the second plate 18 continues to decrease and the spring 24 continue to move toward the compressed position, the second spring 66 may begin to move toward the compressed position. The torque may increase steeply to a second plateau. As the torque nears the second plateau, the torque does not increase or increases relatively slowly, as shown over a second plateau region 72 of the curve 68. Over the second plateau region 72, the slope of the curve 68 is less than the slope of other regions of the curve 68. After the second plateau, the torsion bar of the seatbelt retractor 30 may engage. When the torsion bar engages, the torque may initially increase steeply and move toward a third plateau over a third plateau region 74. The slope of the curve 68 at the third plateau region 74 is less than the slope of other regions of the curve 68.

The numerical adverbs "first" and "second" are used herein merely as identifiers and do not indicate order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a track;
a first plate slidably engaged with the track;

a second plate spaced from the first plate and coupled to the first plate, the second plate being releasably lockable to the track;

a webbing guide supported by the first plate;

a seatbelt webbing extending through the webbing guide;

a spring coupled between the first plate to the second plate; and a guide rod elongated from the first plate to the second plate.

2. The assembly of claim 1, wherein the spring surrounds the guide rod.

3. The assembly of claim 1, wherein at least one of the first plate and the second plate defines a hole, the guide rod being axially movable in the hole.

4. The assembly of claim 1, further comprising a second spring concentric with the spring, the second spring surrounding the guide rod.

5. The assembly of claim 1, wherein the spring biases the first plate away from the second plate.

6. The assembly of claim 1, wherein the spring is elongated along an axis, the first plate being slidable along the axis.

7. The assembly of claim 1, wherein the spring is compressible from an extended position to a compressed position, a distance between the first plate and the second plate being shorter in the compressed position than in the extended position.

8. The assembly of claim 7, wherein the spring is compressible by the seatbelt webbing from the extended position to the compressed position.

9. The assembly of claim 1, wherein the first plate is supported by the spring.

10. The assembly of claim 1, wherein the seatbelt webbing applies a force downwardly on the webbing guide, the webbing guide and the first plate are moveable downwardly along the track when the force exceeds the spring force of the spring.

11. The assembly of claim 10, wherein a distance between the first plate and the second plate decreases as the force is applied.

12. The assembly of claim 10, wherein the spring is compressible between an extended position and a compressed position, the spring being in the compressed position when the force is applied.

13. The assembly of claim 1, further comprising a second spring concentric with the spring, the second spring being between the first plate and the second plate.

14. The assembly of claim 13, wherein the second spring is shorter in axial length than the spring.

15. The assembly of claim 13, wherein the second spring is stiffer than the spring.

16. The assembly of claim 1, wherein the first plate is slidable by the seatbelt webbing relative to the second plate from a raised position to a lowered position.

17. The assembly of claim 1, further comprising a leaf spring between the second plate and the track.

18. A vehicle comprising:

a pillar;

a track supported by the pillar;

a first plate slidably engaged with the track;

a second plate spaced from the first plate and coupled to the first plate, the second plate being releasably lockable to the track;

a webbing guide supported by the first plate;

a seatbelt webbing extending through the webbing guide;

a spring coupled between the first plate to the second plate; and a guide rod elongated from the first plate to the second plate.

19. The assembly of claim 1, wherein the spring surrounds the guide rod.

20. The assembly of claim 1, wherein:

one of the first plate and the second plate defines a hole, the guide rod being axially movable in the hole, a stop on the guide rod that retains the guide rod in the hole; and the guide rod is fixed to the other of the first plate and the second plate.

* * * * *